(No Model.) 2 Sheets—Sheet 1.

C. L. KRABER.
WIRE FABRIC MACHINE.

No. 538,836. Patented May 7, 1895.

Witnesses
K. A. Rau
Chas. S. Hyer

Inventor
Charles L. Kraber
By John Wedderburn
Attorney (No Model.) 2 Sheets—Sheet 2.

C. L. KRABER.
WIRE FABRIC MACHINE.

No. 538,836. Patented May 7, 1895.

Witnesses
K. A. Rau
Chas. E. Hyer

Inventor
Charles L. Kraber.
By John W. Wedderburn
Attorney

UNITED STATES PATENT OFFICE.

CHARLES L. KRABER, OF QUINCY, ILLINOIS.

WIRE-FABRIC MACHINE.

SPECIFICATION forming part of Letters Patent No. 538,836, dated May 7, 1895.

Application filed February 23, 1894. Serial No. 501,239. (No model.)

*To all whom it may concern:*

Be it known that I, CHARLES L. KRABER, a citizen of the United States, residing at Quincy, in the county of Adams and State of Illinois, have invented certain new and useful Improvements in Wire-Fabric Machines; and I do hereby declare the following to be a full, clear, and exact description of the invention, such as will enable others skilled in the art to which it appertains to make and use the same.

This invention relates to wire-working machinery, especially designed for making meshed netting.

The object of the invention is to dispense with reciprocating frames and meshing pinions which alternately carry the mesh wires back and forth between the longitudinal or fence wires to form the half meshes or to form the twist upon themselves (the mesh wires) when the longitudinal wires are not used in the fabric and to substitute rotary motion therefor.

The improvement consists in the specially organized machine and the novel features hereinafter more fully described and claimed and which are shown in the accompanying drawings, in which—

Figure 1:
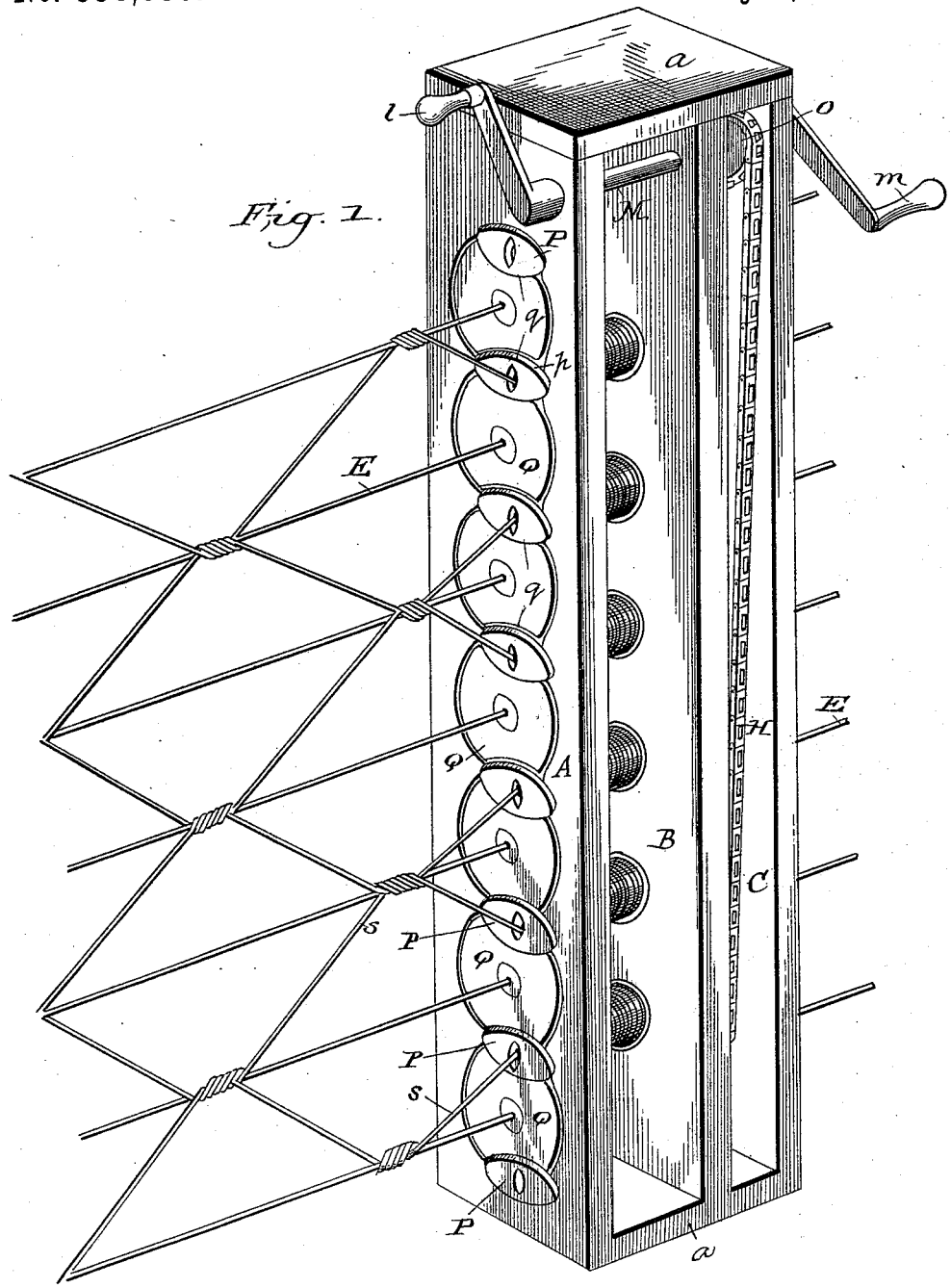
Figure 2:
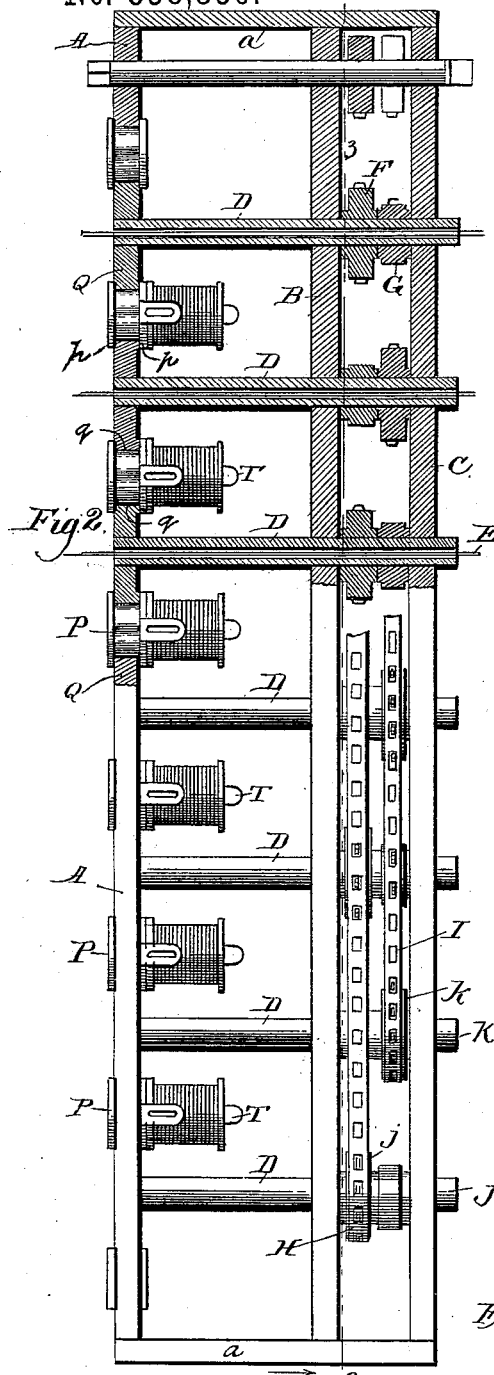
Figure 3:
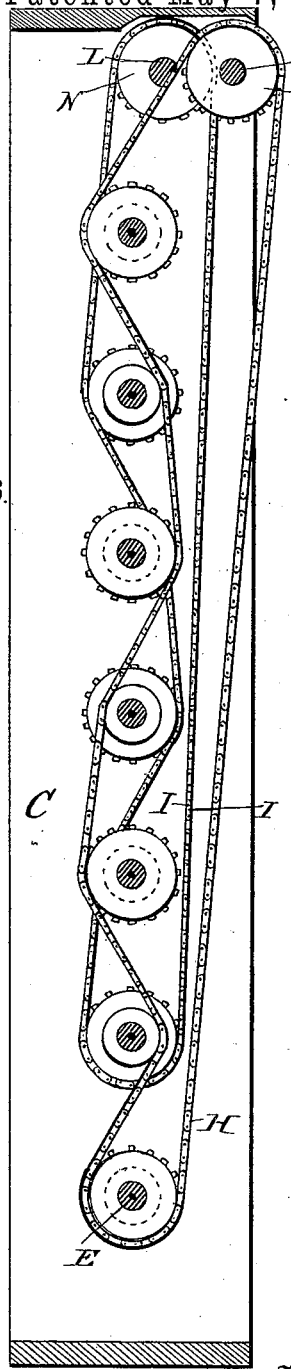
Figure 4:
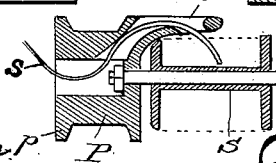

Figure 1 is a perspective view of a machine embodying the invention, showing a portion of the netting made thereby. Fig. 2 is a side elevation, parts being broken away to show more clearly the relative disposition of the operating parts. Fig. 3 is a section on the line 3 3 of Fig. 2, looking in the direction of the arrow. Fig. 4 is a detail section of the mesh-wire guide and the spool attached thereto.

The frame of the machine comprises three parallel strips or bars, A, B, C, and end or head pieces a, connecting the parallel strips. A series of tubular spindles D are journaled at regular intervals in the parallel frame bars A, B, C, and form supports for the longitudinal or fence wires E. On each of these spindles is mounted a head Q with oppositely notched sides to align with the wire guides hereinafter mentioned, a sprocket wheel F and an idle pulley G, the sprocket wheel being keyed to the spindle to impart positive movement thereto. The sprocket wheel and idle pulley are disposed in alternate relation, that is, the sprocket wheel on one spindle is in the same plane as the idle pulleys on the contiguous or adjacent spindles. Sprocket chains H and I pass over the sprocket wheel and pulley from opposite sides so as to operate the alternate spindles in opposite directions to intertwist the mesh wires properly at the point of intersection. A shaft J at the lower end of the frame and a shaft at the upper end operate blank guides with wire guides at ends of the frame to carry single wires to make quarter meshes over selvage longitudinal top and bottom wires. Power driven shafts L and M located near the upper end of the frame and provided at their projecting ends with corresponding cranks $l$ and $m$, have sprocket wheels N and O keyed thereon, respectively, which receive the sprocket chains I and H and serve as means to drive the said chains for operating the wire twisting mechanism as well as changing the relative positions of the mesh wire guides and spools carried thereby. The guides P rest in the cut out portions of the heads Q, and as the shafts of L and M are revolved these heads revolve alternately in opposite directions and carry with them the guides P, so that the said heads are moved up and down to make the required mesh.

The heads Q for carrying the mesh wire guides alternately from one to the other of the fence wires are attached to and carried by the tubular spindles D and have diametrically opposite notches $q$, which co-operate with that portion of the head between the notches of the contiguous guide wire devices. These heads Q are located in the plane of the front bar A and come flush with the front and rear faces thereof. The mesh wire guides P are oval shaped and are located in the notches $q$, of the heads Q. The ends of the guides have flanges $p$, which embrace the sides of the heads Q and interlock therewith to hold the devices in co-operative relation. A guide arm R projects rearward from the guide P and forms an integral part thereof. This guide arm R extends over the spool S which is mounted on a spindle T carried by the guide P. The spools S carry the mesh wires $s$ and are adapted to be removably mounted upon the spindle T so as to be readily replaced by full spools when empty.

It will be understood that in an organized machine the shafts L and M may be driven by any suitable power. For the sake of convenience and illustration the cranks *l* and *m* are shown herein. The longitudinal or fence wires E are carried upon spools or reels, not shown, in the ordinary manner and pass through the tubular spindles D and will be attached to a drawing and evening device of ordinary construction and well known in the art of wire manufacture.

The operation is continuous, the completed netting or fencing being drawn from the machine as quickly as completed.

The tubular spindles are alternately operated to change the relative disposition of the mesh wire guides carried thereby, so as to carry the mesh wires back and forth between the fence wires and and interweave them therewith. During the operation of the alternate spindles, the intermediate ones are stationary, and vice versa. This operation is necessary in order to carry the mesh wires alternately back and forth between the same parallel strands. It will be seen that the flanged ends of the wire guides P embrace the sides of the heads Q and the sides of the front frame bar A and hold the parts in a fixed relative position.

Having thus described the invention, what is claimed as new is—

1. In a wire fabric machine, the combination with a frame, of a series of spindles journaled therein, heads carried by said spindles fitting recesses in the side of said frame and having oppositely disposed notches, guides located between the heads fitting the notches in the adjacent heads and adapted to be moved alternately thereby, and means for alternately moving said spindles in opposite directions, substantially as and for the purpose described.

2. In a wire fabric machine, the combination with a frame, of a series of spindles journaled therein, each carrying a sprocket wheel and idler, a pair of independent drive chains engaging alternately the sprocket wheel and the idler on the successive spindles for the purpose of moving said spindles alternately in opposite directions, drive shafts and wheels for imparting movement to said chains, heads carried by said spindles fitting recesses in the side of the frame and having oppositely disposed notches, mesh wire guides located between the heads fitting the notches in the adjacent heads and adapted to be moved alternately with said heads as they revolve, the said guides having annular flanges at their opposite ends, guide arms integral therewith perforated to receive the mesh wire and having spindles attached to said guide and projecting inward, and having spools mounted and adapted to be carried by said spindles, substantially as and for the purpose described.

In testimony whereof I have signed this specification in the presence of two subscribing witnesses.

CHARLES L. KRABER.

Witnesses:
JAS. N. BROWN,
WM. A. KRABER.